United States Patent [19]

Myers

[11] Patent Number: 4,788,857
[45] Date of Patent: Dec. 6, 1988

[54] TEST STAND APPARATUS AND METHOD FOR TESTING A REBUILT TORQUE CONVERTER

[75] Inventor: John E. Myers, Sparks, Nev.

[73] Assignee: Torque Converter Rebuilding Systems, Reno, Nev.

[21] Appl. No.: 82,081

[22] Filed: Aug. 4, 1987

[51] Int. Cl.[4] ............................................. G01M 19/00
[52] U.S. Cl. ...................................... 73/118.1; 73/49.7
[58] Field of Search ..................... 73/118.1, 40.7, 49.7, 73/49.8

[56] References Cited

U.S. PATENT DOCUMENTS 4,617,824 10/1986 Cybulski et al. ...................... 73/49.7

Primary Examiner—Jerry W. Myracle
Attorney, Agent, or Firm—Chernoff, Vilhauer, McClung & Stenzel

[57] ABSTRACT

A test stand for pressure testing rebuilt torque converters includes a retainer frame assembly for supportably receiving the torque converter and a plug assembly for sealing and pressurizing the interior of the torque converter. The retainer frame assembly includes a cup for receiving the pilot hub of the torque converter and a locking bar with safety latches for retaining the plug assembly in the central aperture of the torque converter when the interior of the torque converter is pressurized. The retainer frame assembly is mounted on a vertical support stand and can pivot 90 degrees with respect to the support stand to change the central axis of the torque converter from vertical to horizontal. The retainer frame assembly is also capable of rotating 360 degrees with respect to the support stand. The torque converter may be installed in the retainer frame assembly when the retainer frame is oriented with the cup facing upwardly so that the retainer frame assembly supports the torque converter. After the plug assembly and locking bar have been engaged, the interior of the torque converter may be pressurized and the retainer frame assembly pivoted until the central axis of the torque converter is horizontal. The torque converter and retainer frame assembly may be rotated while bubble-producing fluid is applied to the circumferential seam of the torque converter.

3 Claims, 1 Drawing Sheet

TEST STAND APPARATUS AND METHOD FOR TESTING A REBUILT TORQUE CONVERTER

BACKGROUND OF THE INVENTION

This invention relates to testing of rebuilt torque converters and particularly to a test stand and method for testing a rebuilt torque converter.

After extended use, torque converters can become worn or clogged with metal shavings and other impurities that migrate into the torque converter from the transmission and become lodged in the vanes of the torque converter. Occasionally, one of the vanes of the torque converter will break off. Accordingly, it is advisable to periodically replace or rebuild worn torque converters.

Rebuilding the torque converter is accomplished by cutting apart the cover of the torque converter around the circumference thereof. After the interior of the torque converter has been cleaned and repaired, the cover of the torque converter may be welded together, leaving a circumferential welded seam. Since the action of the vanes upon the transmission fluid within the torque converter creates a slight over-pressure within the torque converter, it is necessary to check the circumferential seam to make sure that it is properly sealed.

In the past this has been done by pressurizing the interior of the torque converter and applying a bubble-producing fluid to the entire circumferential seam. Considering the size and weight of a torque converter, this can be an awkward job.

SUMMARY OF THE INVENTION

The present invention provides a convenient test stand and a simple method for testing rebuilt torque converters.

A test stand according to the present invention includes a frame for supportably receiving a torque converter, a stand for supporting the frame, and a plug for sealing the central aperture of the torque converter, the plug including means for permitting the interior of the torque converter to be pressurized while the plug is positioned in the central aperture of the torque converter, and the frame including means for retaining the plug in the torque converter when the interior of the torque converter is pressurized.

The method for testing a torque converter according to the present invention includes providing a frame for supportably mounting a torque converter with its central axis horizontal, providing a stand to support the frame, providing bearing means for permitting the frame carrying the torque converter to rotate approximately 360 degrees about its central axis, sealing the central aperture of the torque converter, pressurizing the interior of the torque converter, and rotating the torque converter about its central axis while applying a bubble-producing fluid to the circumferential seam.

Accordingly, it is a principal object of the present invention to provide a test stand for testing rebuilt torque converters.

It is another principal object to provide an improved method for testing rebuilt torque converters.

It is a further object to provide a test stand including a rotatable retainer frame for supportably receiving and rotating the torque converter about its central axis.

It is a related object to provide such a test stand which arranges the central axis of the torque converter substantially horizontal.

It is a further object to provide a test stand which is capable of pivoting the central axis of the torque converter 90 degrees while the torque converter is supported by the test stand.

It is another object to provide a test stand which includes safety features for ensuring that the pressure in the torque converter does not cause injury or property damage.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
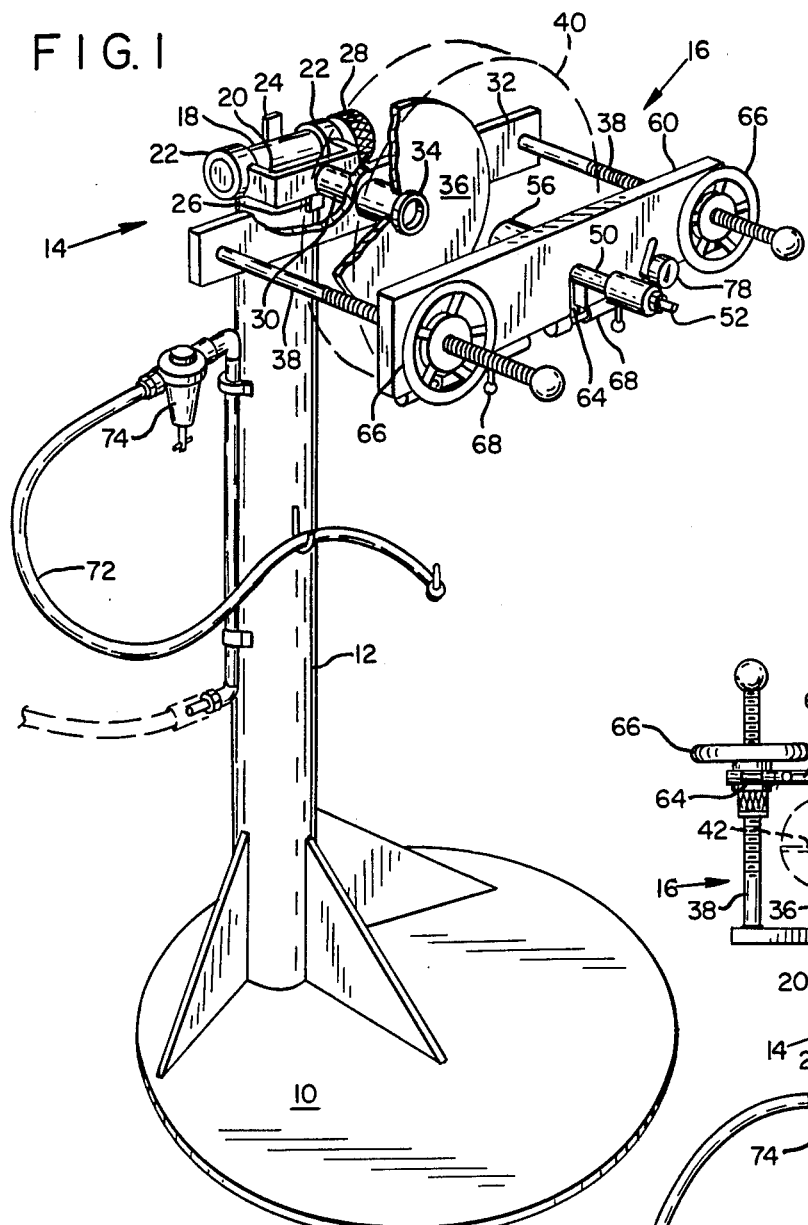
FIG. 1 is a perspective view of an exemplary embodiment of a torque converter according to the present invention which has been partially broken away to show the pivot yoke assembly.
Figure 2:
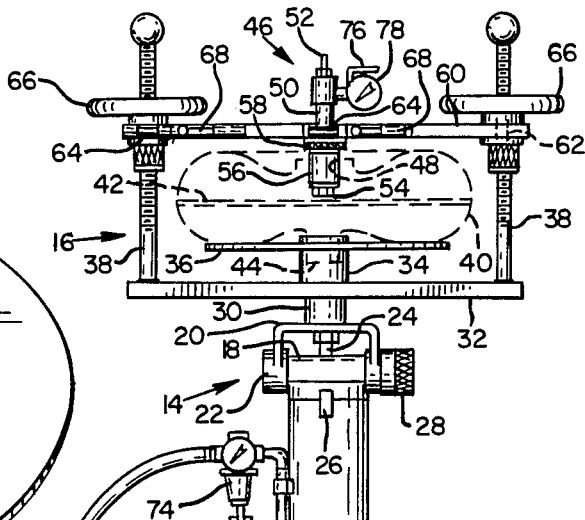
FIG. 2 is an elevational view of the exemplary embodiment of the test stand.
Figure 3:
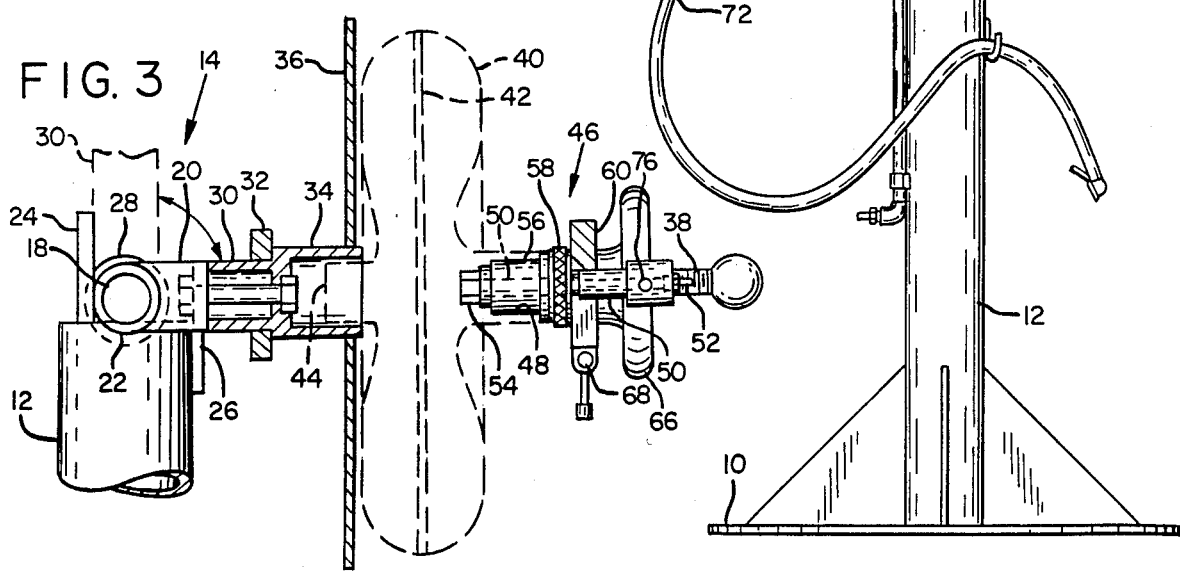
FIG. 3 is a partial, cross-sectional view of the test stand showing details of the pivot yoke assembly, hub, and plug assembly.

Referring to FIGS. 1-3, the exemplary embodiment of a test stand according to the present invention includes a pedestal base 10 having a vertical post 12 rigidly affixed thereto. A pivot yoke assembly 14 is attached to the top of the post and mounts a torque converter retainer frame assembly 16 thereto.

The pivot yoke assembly includes an elongate pivot pin 18 welded to the top of the post so that the axis of the pivot pin is substantially horizontal, with the respective axes of the post and pivot pin intersecting proximate the mid-point of the pivot pin. A yoke 20 includes a pair of spaced apart sleeves 22 which fit over either end of the pivot pin to permit the yoke to pivot about the pivot pin. However, two stops, a vertical stop 24 and a horizontal stop 26, are welded to the top of the post to prevent the yoke from pivoting more than 90 degrees about the axis of the pivot pin. The pivot pin includes a threaded bore, not shown, which receives the threaded shaft of a hand nut 28 which may be tightened against one of the sleeves of the yoke to selectively prevent the yoke from pivoting with respect to the pivot pin.

The retainer frame assembly is rotatably attached to the yoke by a hub 30 including a bushing which permits the hub and retainer frame assembly to rotate with respect to the yoke. The hub passes through a hole in an elongate support bar 32 and is welded thereto. The hub includes a cup 34 and a safety plate 36 welded to the outer circumference of the cup.

A pair of elongate threaded rods 38 are fastened to either end of the support bar so that they project perpendicularly from the support bar. The remaining components of the retainer frame assembly, as well as other features of the test stand, will be explained in connection with the method of operation of the test stand.

Referring to FIG. 2, a torque converter 40 which has been cut apart, rebuilt, and welded together leaving a circumferential seam 42 is mounted in the retainer frame assembly of the test stand by seating the projecting pilot hub 44 of the torque converter in the cup 34 of the hub 30 of the test stand.

Turning to FIG. 3, a plug assembly 46 is placed in the central aperture 48 of the torque converter. The plug assembly includes a hollow central shaft 50 with an air filler valve 52 mounted in the top of the central shaft. The lower portion of the central shaft is threaded to receive a lock nut 54, rubber compression bushing 56, and a knurled hand nut 58. When the hand nut 58 is tightened, the compression bushing is squeezed between the hand nut and the lock nut, increasing the circumference of the compression bushing and sealing the interior of the torque converter.

An elongate safety lock bar 60, having an aperture 62 at one end and slots 64 at the other end and at the middle of the lock bar, is placed over the torque converter, substantially parallel to the support bar 32, with the rods 38 respectively received in the aperture 62 and in the slot 64 which is at the other end of the lock bar. The median slot 64 in the locking bar receives that portion of the central shaft 50 of the plug assembly which is between the hand nut and the filler valve. A pair of hand wheels 66 threaded on the respective rods 38 are tightened down on either end of the lock bar, forcing the lock bar tightly against the hand nut of the plug assembly. Referring to FIGS. 1 and 2, the lock bar includes a pair of sliding safety latches 68 which are spring-loaded to close the mouths of the slots 64. This is an additional safety device to ensure that the lock bar does not disengage from the plug assembly.

The interior of the rebuilt torque converter may now be pressurized by a source of compressed air through an airhose 72 which is fitted over the air filler valve. A pressure regulator 74 mounted on the test stand limits the amount of air pressure within the torque converter to 60 psi, for example. Such pressure will not blow the plug assembly out of the central aperture of the torque converter because the plug assembly is locked in place by the safety bar, hand wheels, and safety latches. After the interior of the torque converter has been pressurized, the airhose may be disengaged from the air filler valve.

After the torque converter has been locked into the retainer frame assembly, the hand nut 28 associated with the pivot yoke assembly is loosened and the entire retainer frame assembly may be pivoted 90 degrees from the position shown in FIG. 2 to the position shown in FIG. 1. This changes the axis of rotation of the retainer frame assembly from vertical to horizontal. To test the weld which comprises the circumferential seam 42 of the rebuilt torque converter, the retainer frame assembly and torque converter may be rotated about a horizontal axis while bubble producing fluid such as water and detergent is applied to the seam. Since the seam is now oriented in a vertical plane, the bubble-producing fluid will run along the seam as the torque converter is rotated in the retainer frame.

If the weld comprising the circumferential seam is perfect, no bubbles will occur, and the rebuilt, now tested, torque converter can be removed from the test stand. Prior to removing the lock bar and the plug assembly, pressure in the torque converter may be relieved by a pressure relief valve 76 attached to the central shaft and communicating with the hollow bore of the central shaft. A pressure gauge 78 is associated with the plug assembly to provide the operator with a precise pressure reading of the interior of the torque converter.

From the foregoing explanation, the advantage of orienting the torque converter for rotation about a horizontal axis should be readily understood. In addition, due to the substantial weight of the torque converter it would be difficult to hold it in proper relation to the retainer frame assembly while the plug assembly and safety bar are being installed. Therefore, having the retainer frame oriented as shown in FIG. 2 makes it much easier to position the torque converter in the cup, install the plug assembly and lock the safety bar in place while the weight of the torque converter is supported by the support stand located directly beneath its center of gravity.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A test stand for pressure testing fluid couplings such as a torque converter of the type having a central aperture comprising:
   (a) frame means for supportably receiving said torque converter;
   (b) support means associated with said frame means for supporting said frame above a supporting surface;
   (c) plug means for sealing said central aperture of said torque converter, said plug means including passage means for permitting the interior of said torque converter to be pressurized while said plug means is securely received in said aperture;
   (d) said frame means including retainer means for retaining said plug means in said aperture of said torque converter when the pressure inside said torque converter exceeds the pressure outside of said torque converter;
   (e) bearing means operatively interposed between said support means and said frame means for permitting said frame means to rotate with respect to said support means; and
   (f) pivot means operatively interposed between said support means and said bearing means for permitting said bearing means and said frame means to pivot approximately 90 degrees with respect to said support means.

2. The test stand of claim 1 wherein said support means has a substantially vertical central axis, said bearing means and said frame means having a substantially common central axis, said pivot means including means for permitting said bearing means and said frame means to pivot from a position where said central axis of said bearing means and said frame means is substantially vertical to a position where said central axes are substantially horizontal.

3. A method for pressure testing a fluid coupling such as a torque converter of the type having a central aperture, a central axis, and a circumferential seam defining a plane perpendicular to the central axis, said method comprising:
   (a) providing a frame for supportably mounting said torque converter with its central axis substantially horizontal;
   (b) providing a stand for supporting said frame above a supporting surface;

(c) providing bearing means for permitting said frame carrying said torque converter to rotate approximately 360 degrees about its central axis;

(d) sealing said central aperture;

(e) pressurizing the interior of said torque converter; and (f) rotating said torque converter substantially 360 degrees about its central axis while applying a bubble-producing fluid to said circumferential seam.

* * * * *